United States Patent [19]

Rutili

[11] Patent Number: 4,768,300
[45] Date of Patent: Sep. 6, 1988

[54] ILLUMINATED INFORMATION DISPLAY
[75] Inventor: Renzo N. Rutili, Evanston, Ill.
[73] Assignee: Stewart Warner Corporation, Chicago, Ill.
[21] Appl. No.: 845,252
[22] Filed: Mar. 28, 1986
[51] Int. Cl.[4] .............................................. G09F 13/18
[52] U.S. Cl. ....................................... 40/546; 40/448; 40/453; 40/541; 40/563
[58] Field of Search ................ 40/546, 541, 547, 563, 40/448, 450, 451, 452, 453; 350/330

[56] References Cited

U.S. PATENT DOCUMENTS

| 788,050 | 4/1905 | Johnson | 40/546 |
|---|---|---|---|
| 2,795,069 | 6/1957 | Hardesty | 40/546 |
| 2,805,505 | 9/1957 | Hardesty | 40/546 |
| 2,810,225 | 10/1957 | Hardesty | 40/546 |
| 2,821,799 | 2/1958 | Partridge | 40/546 |
| 2,848,830 | 8/1958 | Dmitrieu et al. | 40/546 |
| 3,205,598 | 9/1965 | Grosse | 40/453 |
| 3,349,511 | 10/1967 | Aronoff | 40/546 |
| 3,653,138 | 4/1972 | Cooper | 40/453 |
| 3,780,463 | 12/1973 | Arnoff | 40/546 |
| 3,789,318 | 1/1974 | Ostrowsky et al. | 350/330 |
| 4,026,103 | 5/1977 | Ichikawa et al. | 350/330 |
| 4,448,489 | 5/1984 | Sato et al. | 350/330 |

FOREIGN PATENT DOCUMENTS 816795  8/1937  France ............................ 40/546

Primary Examiner—Carl D. Friedman
Assistant Examiner—Michael Safavi
Attorney, Agent, or Firm—Lorusso & Loud

[57] ABSTRACT

An illuminated information display including a standard planar active display, such as an LCD display, covered by a rigid transparent plate with fixed graphics on its rear surface illuminated by light transmitted laterally through the plate.

6 Claims, 2 Drawing Sheets

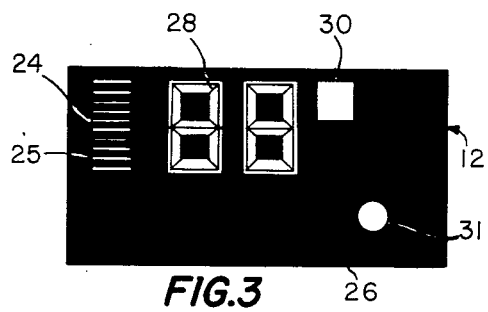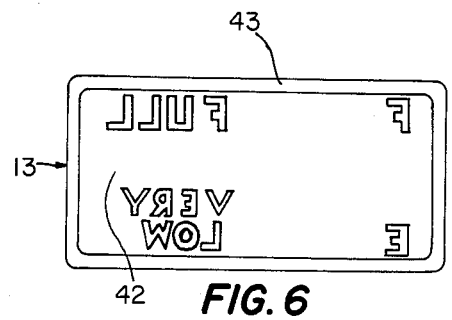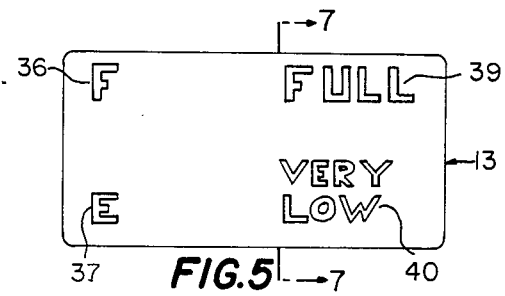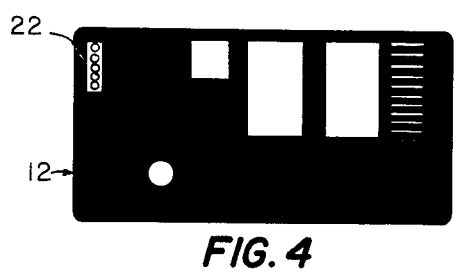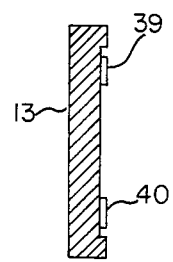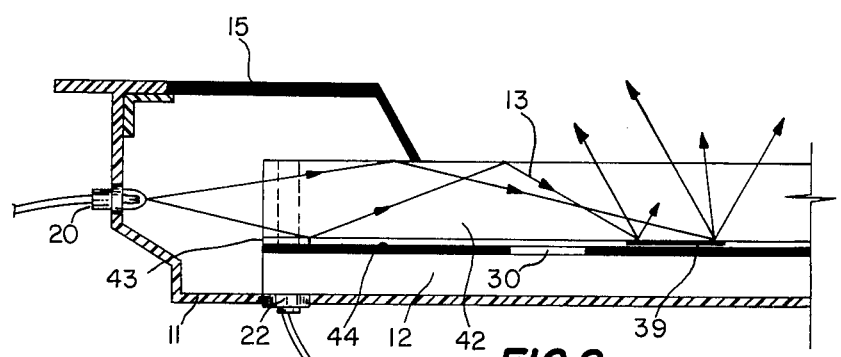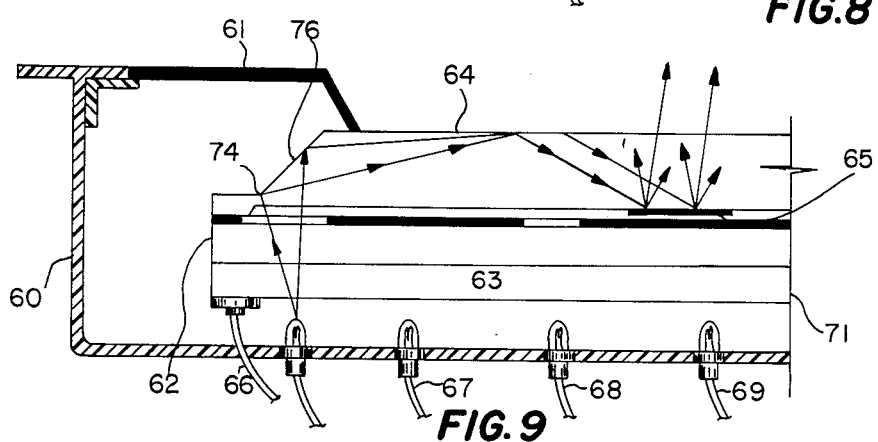

ILLUMINATED INFORMATION DISPLAY

BACKGROUND OF THE INVENTION

Electronic flat panel displays have achieved considerable commercial success in the last decade in vehicular instrumentation as well as in office and factory equipment and in other applications. In vehicles for example, such information displays may provide fuel, temperature and pressure information with seven segment digit displays composed of active LED (light emitting diodes) or LCD elements and/or with an LED or LCD (liquid crystal display) bar graph. Engine speed and vehicle speed information is another example.

These flat panel displays are generally divided into groups, those which are self-illuminated and those which are not, e.g. an LED display is self-illuminating and an LCD display is not. The problem confronting the display system manufacturer, and these manufacturers in large part are not the manufacturers of active display elements, is to combine additional graphics such as symbols and word information with the active elements and to illuminate them adequately in a relatively low-cost manner. Fixed graphics such as by printing applied to the forward surface of these active elements and the non-self illuminating active elements must be illuminated. Light sources that provide this illumination create reflection problems and in spite of extensive efforts have not provided adequate.

Edge-lighted graphic elements are broadly known in the prior art, such as shown in the Swatten U.S. Pat. No. 4,247,747 in which a flexible plastic sheet carrying numeric switch indicia covers a flexible contact switch with a plurality of switches each under one of the switch numbers on the flexible transparent sheet. In the Swatten patent there are no active display elements and the graphics may be printed on either the front or the rear sheet of the flexible transparent sheet, and further the sheet itself is thin and flexible and spaced too far from a backing sheet to adequately illuminate the graphics thereon.

It is the primary object of the present invention to ameliorate the problems noted above in active and passive informational graphic display combinations.

SUMMARY OF THE PRESENT INVENTION

According to the present invention an illuminated electronic information display panel is provided that utilizes planar LED or LCD active element displays, usually the non-self illuminating type, with a variety of fixed applied graphics that are both illuminated in all ambient light conditions as well as or better than self-illuminated active display elements. This is accomplished through the provision of a rigid transparent plastic plate covering but slightly spaced from the front of the active element display. Opaque graphics in colors contrasting to opaque areas on the active element display are applied by simple printing techniques to the rear surface of the transparent plate and illuminated by light transmitted and deflected laterally through the plate itself which acts not only as a light conductor but a protective cover plate. This light conducting plate also illuminates the adjacent active elements if they are the non-self illuminating type.

Light is transmitted through this light conductive plate either by edge-lighting the plate or rear-lighting with a beveled deflector edge on the plate that deflects the rear light laterally into the transparent plate.

This technique permits the manufacturer of the total dislay to purchase standardized active display elements, particularly non-self illuminating active elements such as LCD displays, without requiring any custom tooling and add specialized symbol and alpha numeric graphics by inexpensive printing techniques on the transparent cover plate, and then assemble them into a display with the appropriate drive circuitry.

To achieve this superior illumination of the fixed graphics and the active elements, the transparent forward plate should be rigid and spaced a few thousandths of an inch from the active display element, and the fixed graphics printing should be opaque and contrasting in color to the area of the active element immediately behind it.

BRIEF DESCRIPTION OF THE DRAWINGS

FIG. 3 is a front view of an active element display illustrated in FIG. 2;

FIG. 4 is a rear view of the active element display illustrated in FIG. 3;

FIG. 5 is a front view of a transparent conductor plate with applied fixed graphics illustrated in FIG. 2;

FIG. 6 is a rear view of the conductor plate illustrated in FIG. 5;

FIG. 7 is a cross-section of the conductor plate taken generally along line 7—7 of FIG. 5;

FIG. 8 is a fragmentary section of the assembled information display illustrated in FIG. 1; and FIG. 9 is a fragmentary section similar in position to FIG. 8 of a modified form of the information display.

DETAILED DESCRIPTION OF THE PREFERRED EMBODIMENTS

Figure 1:
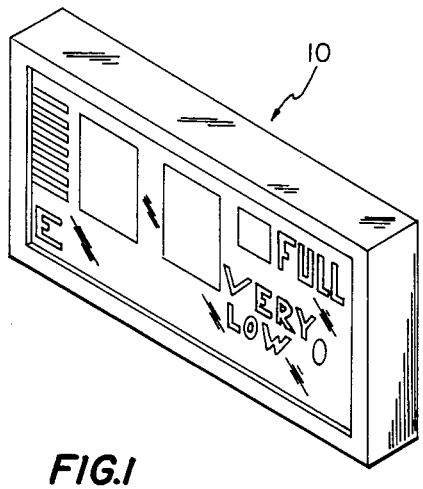
FIG. 1 is a perspective view of an information display according to the present invention.
Figure 2:
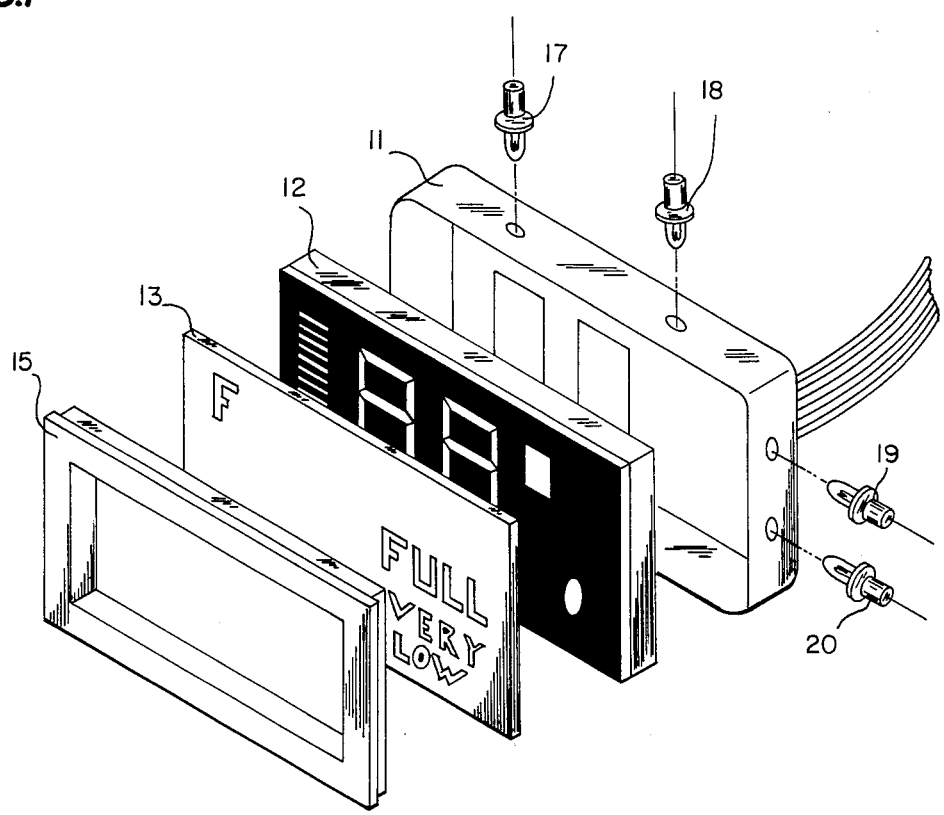
FIG. 2 is an enlarged exploded view of the information display illustrated in FIG. 1.

Referring to the drawings and particularly to FIGS. 1 to 5, an information display 10 is illustrated according to the present invention and is seen to generally include a rectangular housing 11, a planar active dislay plate 12, a planar graphics and cover plate 13, and a rectangular bezel 15 that holds the assembly together in the housing 11. Bayonet mounted bulb assemblies 17, 18, 19 and 20 are positioned in the housing 11 to edge-light the transparent cover plate 13. A connector 22 (see FIG. 8) is mounted in the rear of the housing 11 and connects a ribbon conductor to the rear of the active planar plate 12 to provide current to the active elements therein. Bulb assemblies 17, 18, 19 and 20 could be replaced with other light sources such as LEDs.

Viewing FIGS. 3 and 4 where the plate 12 is shown in sub-assembly fashion, it should be understood that the specific form of the active elements shown is merely exemplary and other arrangements and forms of active elements may be utilized. These active display elements may be LED's or LCD's. In the embodiment shown the active elements include an LCD bar graph 24 that has a plurality of individual bars 25 energized sequentially in known fashion to provide an analog visual representation of a measured value, such as fuel level. The LCD bars 25 are of the type that when activated provide a light color illumination since background areas 26 on the front face of the plate 12 are black and opaque. Also provided in active plate 12 is a two-digit seven-segment LCD display 28 also having light colored segments when activated. Discrete on/off LCD elements 30 and 31 also light in color are provided in the other side of the active plate 12.

The graphics and cover plate 13, illustrated as a subassembly assembly in FIGS. 5, 6, and 7, is constructed of a rigid transparent plastic and is at least 0.060 inches in thickness to provide the proper transmission of light from the bulbs 17, 18, 19 and 20 all across the interior of the plate. The plate 13 serves as a protective cover for the active element plate 12 and also provides illumination for graphics carried by the plate 13.

The graphics are applied to the rear surface of plate 13 by suitable printing techniques, such as silk screening, and they are opaque and constrasting in color to the opaque areas 26 on the forward surface of the plate 12 between the active display elements. It is important for proper illumination that the graphics be applied to the rear surface of plate 13. In this case the applied graphics to the plate 13 are white because the background areas 26 on plate 12 are black. The exemplary graphics shown include F and E characters 36 and 37 and FULL and VERY LOW alpha indicia 39 and 40. The F and E characters are positioned to overlie the top and bottom areas of the bar graph 24 and the FULL and VERY LOW symbols 39 and 40 are positioned to overlie the background areas adjacent to the active elements 30 and 31. It should be understood that, the arrangement of the active elements and graphics illustrated on plates 12 and 13 is merely exemplary and other arrangements of active elements combined with other graphic symbols and alpha numeric information is within the scope of this invention. The graphics can be varied by the display manufacturer to utilize a single standard active plate 12 for a variety of informational displays.

As seen in FIG. 6, rear surface 42 of the cover plate 13 has a peripheral flange 43 (also see FIG. 8) that spaces the rear surface 42 several thousandths of a inch from active plate surface 44 as seen clearly in FIG. 8, preferably on the order of 0.003 to 0.010 inches. The combination of tranparent plate thickness and spacing between the rear wall of the transparent plate and forward wall 44 of the active element plate and the opaque and contrasting graphics on the rear surface of the plate 13, provides a readability of the applied graphics equal to or better than that of the electronically energized graphics in active plate 12 throughout a range of ambient light conditions from total darkness to bright sunlight.

An alternative embodiment is illustrated in FIG. 9 and is seen to include a similar housing 60 and bezel 61 holding in assembled position an active element plate 62 with active elements 63 and a transparent rigid plastic cover plate 64 with fixed graphics 65 applied to its rear surface that are illuminated by a plurality of peripherally arranged bulb units 66, 67, 68 and 69, etc. mounted in housing rear surface 71. These bulb units could be replaced by other light sources such as an electroluminescent panel. In this case the active element plate 62 is transparent and has a transparent window 74 on its forward face extending around its periphery that permits light to pass from the rear light source into transparent plate 64 where it is deflected by beveled plate edge 76 transversely through the plate 64 to illuminate the fixed graphics elements 65.

I claim:

1. An illuminated display including electronically activated display elements and fixed graphic display elements, comprising:
    a first opaque plate having a plurality of selectively energizable active planar display elements;
    a rigid transparent plastic second plate closely adjacent but spaced from a front of the first plate, said second plate being sufficiently thick to transmit light laterally therethrough;
    a plurality of fixed graphic elements secured on a rear of the second plate positioned so that the graphic elements are not in line with the active display elements whereby the first opaque plate defines a background for the graphic elements when the active display elements are energized;
    said fixed graphic elements being substantially opaque and contrasting in color to the opaque first plate, said first and second plates being constructed so that different second plates can be utilized with the first plate; and
    a source of light directed laterally into the transparent second plate whereby light deflecting in the second plate illuminates the front of the fixed graphic elements against the contrasting opaque first plate with the active elements illuminated.

2. An illuminated display as defined in claim 1, wherein the first plate planar display elements are liquid crystal devices.

3. An illuminated display as defined in claim 1, wherein the first plate planar display elements are light emitting diodes.

4. An illuminated display as defined in claim 1, wherein the second plate has a smooth peripheral edge surface perpendicular to front and rear surfaces, said source of light being positioned to direct light through the edge surface into the transparent second plate.

5. An illuminated display as defined in claim 1, wherein the second plate has a peripheral surface angularly related to front and rear surfaces, said first plate permitting light from a rear surface thereof to pass therethrough to a rear surface of the second plate adjacent the peripheral surface thereof, said source of light being positioned at the rear of the first plate to direct light through light transmitting portions thereof into the second plate so light is deflected therein by the angularly related peripheral surface into and across the transparent second plate.

6. An illuminated display as defined in claim 1, wherein the second plate is at least 0.060 inches thick.

* * * * *